350-379 SR

OR 3,753,608

T4002Y WP

X4021Y

X4035Y

United Stat

Bernal G.

[11] 3,753,608

[45] Aug. 21, 1973

[54] OPTICAL POLARIZATION SPOT SIZE CHANGING DEVICES

[75] Inventor: Enrique Bernal G., Minnetonka, Mich.

[73] Assignee: Honeywell Inc., Minneapolis, Minn.

[22] Filed: Apr. 15, 1971

[21] Appl. No.: 134,246

[52] U.S. Cl. .................. 350/150, 350/147, 350/157, 350/162 SF, 350/169, 350/DIG. 2

[51] Int. Cl. .............................................. G02f 1/26

[58] Field of Search .................... 350/147, 150, 157, 350/160, DIG. 2, 169–174, 162 SF

[56] References Cited

UNITED STATES PATENTS 3,624,817 11/1971 Lee et al. .............................. 350/90

*Primary Examiner*—David Schonberg
*Assistant Examiner*—Paul R. Miller
*Attorney*—Lamont B. Koontz, Omund R. Dahle and David R. Fairbairn

[57] ABSTRACT

In a beam-addressed optical memory, the spatial pattern of the focused light spot is selectively changed by making the light from the source traverse either a first or a second path. The focused light spot has a first spatial pattern when the light beam traverses the first path and a second, different, spatial pattern when the light beam traverses the second path.

27 Claims, 17 Drawing Figures

INVENTOR.
ENRIQUE BERNAL G.
BY Osmund R. Dahle
ATTORNEY.

INVENTOR.
ENRIQUE BERNAL G.
BY Osmund R. Dahle
ATTORNEY.

INVENTOR.
ENRIQUE BERNAL G.
BY
Osmund R. Dahle
ATTORNEY.

FIG. 7a
| LOCATION ON PATH | A | F |
|---|---|---|
| POLARIZATION DIRECTION | ↑⊗ | ↑⊗ |
↑⊗ FIRST POLARIZATION DIRECTION
⊗→ SECOND POLARIZATION DIRECTION
⊗ PROPAGATION DIRECTION OF LIGHT BEAM
FIG. 7b
| LOCATION ON PATH | A | $B_E$ | $C_E$ | $C_R$ | $B_R$ | $D_E$ | $E_E$ | $E_R$ | $D_R$ | F |
|---|---|---|---|---|---|---|---|---|---|---|
| POLARIZATION DIRECTION | ⊗→ | ⊗→ | ↺ ⊗ | ↻ ⊗ | ↑⊗ | ↑⊗ | ↻ ⊗ | ↺ ⊗ | ⊗→ | ⊗→ |
FIG. 8
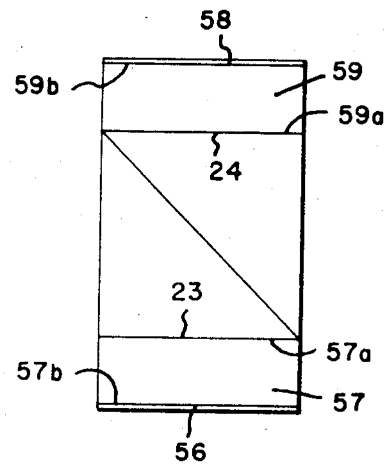
FIG. 9
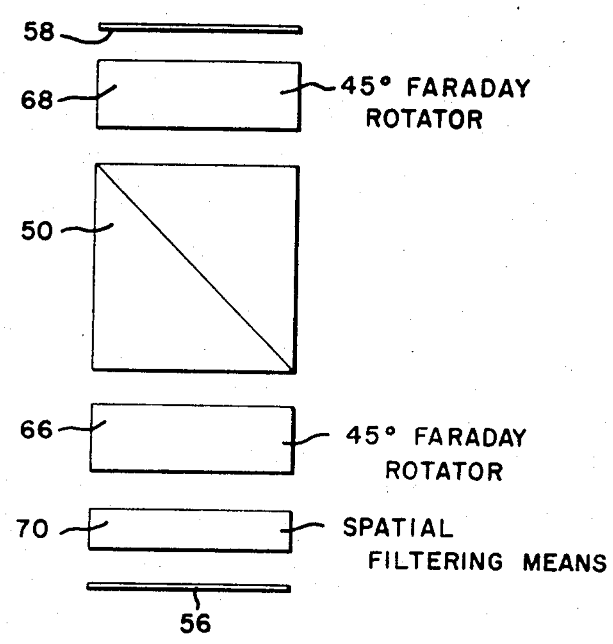
INVENTOR.
ENRIQUE BERNAL G.
BY
Osmund R. Dahle
ATTORNEY.

INVENTOR.
ENRIQUE BERNAL G.
BY Osmund R. Dahle
ATTORNEY.

OPTICAL POLARIZATION SPOT SIZE CHANGING DEVICES

BACKGROUND OF THE INVENTION

The present invention is directed to an optical device for selectively changing the spatial pattern of a focused light spot. As used in this specification, the term "light" means electromagnetic waves within the frequency band including infrared, visible and ultraviolet light.

In may optical systems, it is highly desirable to change the size or spatial pattern of a focused light spot in a rapid manner. In the prior art, spot size changing has been accomplished by mechanically driven zoom lenses, which are incapable of high speed changes required for many applications.

One application in which rapid spot size changing is used to great advantage is in a beam-addressed optical mass memory such as that shown by L. D. McGlauchlin et al. in U.S. Pat. No. 3,368,209 which is assigned to the same assignee as the present application. In this system, a laser beam heats discrete portions of thin magnetic material above the Curie temperature to alter the magnetization direction at that point. The system retrieves stored information by attenuating the laser beam to permit non-destructive readout by using the Faraday or Kerr magneto-optic effect. The information stored on the film can be erased by heating the portions of the film desired to be erased to the Curie temperature with the laser and simultaneously applying a magnetic field.

The ability to change the spatial pattern of a focused light spot is desirable in a beam-addressed optical mass memory using Curie point writing and erasing for several reasons. First, the danger of incomplete erasure due to misregistration can be avoided by erasing a larger area than was written. Second, the focused spot has a non-uniform intensity distribution such as a Gaussian distribution and therefore only the center portion of the spot is heated above the writing temperature and spots smaller than the beam diameter are written. During reading, it is desirable to have a focused light spot no larger than the written spot since light outside the edge of the written spot sees the unwritten film, and does not contribute to the read signal. Therefore, the read signal in an optical mass memory can be enhanced either by using a smaller spot size for reading than for writing, or by altering the spatial pattern of the focused light spot and increasing the laser power during writing so that a larger spot is written.

One approach to rapid spot size changing of a focused laser beam at high speed is described in a copending patent application Ser. No. 134,245, filed Apr. 15, 1971, entitled "Optical Spot Size Changer" by James D. Zook which was filed on an even date herewith and which is assigned to the same assignee as the present application. In this approach a body of electro-optic material is positioned in the path of the light beam to controllably reduce the effective aperture of the light beam in response to an applied electrical field. This causes a change in the focused light spot size. Although this device has several advantages, focused light spots with certain spatial patterns are not readily obtainable with this device. The present invention allows somewhat greater flexibility in the spatial patterns available for focused light spots.

SUMMARY OF THE INVENTION

The optical device of the present invention includes polarization changing means, first and second polarization sensitive means, and beam directing means. The polarization changing means controllably changes the polarization direction of the polarized light beam from the light source from a first polarization direction to a second polarization direction. The first polarization sensitive means has an entrance window and first and second exit windows. The first polarization sensitive means is so constructed and arranged that a light beam entering the entrance window emerges from the first exit window if the light beam has a first polarization direction and emerges from the second exit window if the light beam has a second polarization direction.

The second polarization sensitive means has first and second entrance windows and an exit window. Second polarization sensitive means is so constructed and arranged that a light beam entering the first entrance window emerges from the exit window toward the focusing means if the light beam has a first polarization direction. Similarly, a light beam entering the second polarization sensitive means through the second entrance window is directed to emerge from the exit window if the light beam has a second polarization direction.

Beam directing means is positioned to receive a light beam emerging from the second exit window of the first polarization sensitive means and to direct the light beam toward the second polarization sensitive means such that the light beam enters the second polarization sensitive means through the second entrance window and is directed to emerge from the exit window.

In this manner, a light beam having a first polarization direction which enters the first polarization sensitive means through the entrance window traverses the first path while a light beam having a second polarization direction traverses the second path. The first path comprises entering the entrance window of the first polarization sensitive means, emerging from the first exit window, entering the first entrance window of the second polarization sensitive means, and emerging from the exit window toward the focusing means. The second path comprises entering the first polarization sensitive means through the entrance window, emerging from the second exit window, entering the second polarization sensitive means through the second entrance window, and emerging from the exit window co-linear with the first path.

It can be seen that the first and second paths represent different optical distances from the last beam waist before entering the device to the focusing means. In the present invention, the focused light spot formed by a light beam traversing the first path is different from that produced by the light beam traversing the second path.

BRIEF DESCRIPTION OF THE DRAWINGS

FIGS. 7*a* and 7*b* schematically show the polarization direction of a light beam at various points in the first and second paths shown in FIG. 2.

FIG. 8 shows an embodiment of the present invention in which the polarization sensitive means, the first and second reflective means, and the first and second polarization shifting means comprise a unitary body.

FIG. 9 shows another embodiment of the present invention including first and second 45° Faraday rotators and spatial filtering means.

DESCRIPTION OF THE PREFERRED EMBODIMENTS

Figure 1:
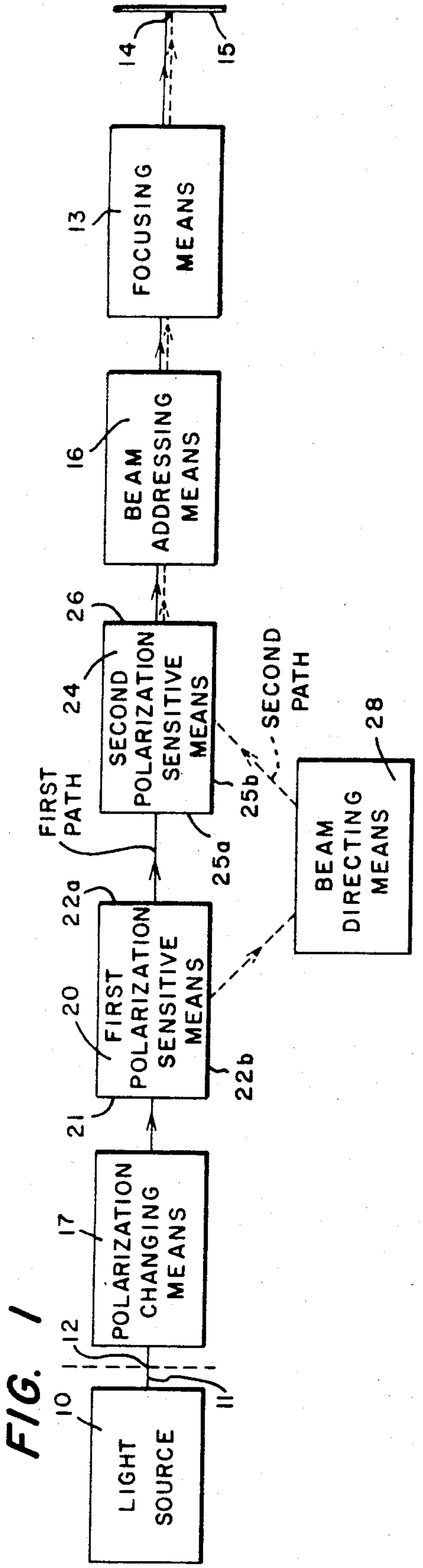
FIG. 1 shows an optical system including the optical device of the present invention for selectively changing the spatial pattern of the focused light spot.

In FIG. 1 is shown a beam-addressed optical mass memory which includes one embodiment of the optical device of the present invention. Light source 10 provides an essentially coherent polarized light beam 11. Light beam 11 includes a beam waist 12. Focusing means 13 forms a focused light spot 14 at the plane of the optical memory medium 15. Beam addressing means 16 selectively directs light beam 11 to various positions on memory medium 15. Beam addressing means 16 may comprise, for example, electro-optic, acousto-optic or mechanical light beam deflectors. Polarization changing means 17, which may comprise for example an electro-optic, acousto-optic or magneto-optic device, is positioned in the path of light beam 11. Polarization changing means 17 controllably changes the polarization direction of light beam 11 from a first polarization direction to a second polarization direction. First polarization sensitive means 20 is positioned in the path of light beam 11 between polarization changing means 17 and focusing means 13. First polarization sensitive means 20 has an entrance window 21, through which light beam 11 enters from polarization changing means 17, and first and second exit windows 22a and 22b, respectively. Second polarization sensitive means 24 is positioned between first polarization sensitive means 20 and focusing means 13. Second polarization sensitive means 24 has first and second entrance windows **25*a* and 25*b* respectively and an exit window 26 from which light beam 11 emerges toward focusing means 13. Beam directing means 28 is positioned to receive a light beam emerging from second exit window 22*b* of first polarization sensitive means 20 and to direct the beam toward second polarization sensitive means 24 such that the beam enters second polarization sensitive means 24 through second entrance window 25*b***.

First polarization sensitive means 20 is so constructed and arranged that if light beam 11 has a first polarization direction when it enters entrance window 21, first polarization sensitive means 20 directs light beam 11 to emerge from first exit window **22*a*. If on the other hand, light beam 11 has the second polarization direction upon entering entrance window 21, light beam 11 is directed to emerge from second exit window 22*b***.

Second polarization sensitive means 24 is so constructed and arranged that light beam 11 is directed to emerge from exit window 26 if light beam 11 enters first entrance window **25*a* with the first polarization direction or if light beam 11 enters second entrance window 25*b* with the second polarization direction. Therefore, when light beam 11 enters first polarization sensitive means 20 through entrance window 21** it traverses a first path (shown by solid lines) if it has a first polarization direction and a second path (shown by dashed lines) if it has a second polarization direction.

In operation, light beam 11 has either the first or the second polarization direction after passing through polarization changing means 17. If light beam 11 has the first polarization direction, it enters first polarization sensitive means 20 through entrance window 21, emerges from first exit window **22*a*, enters second polarization sensitive means 24 through first entrance window 25*a* and emerges from exit window 26 toward focusing means 13**.

If on the other hand, light beam 11 has a second polarization direction upon entering first polarization sensitive means 20 through entrance window 21, light beam 11 is directed to emerge from second exit window 22. Beam directing means 28 direct light beam 11 to enter second polarization sensitive means 24 through second entrance window **25*b*. Since light beam 11 has a second polarization direction, second polarization sensitive means 24 directs light beam 11 to emerge from exit window 26 co-linear with the first path traversed when light beam 11** has a first polarization direction.

Figure 2A:
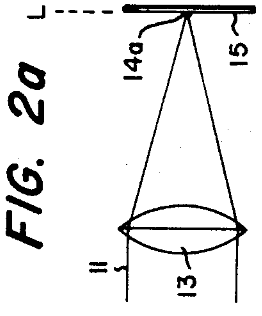
FIGS. 2*a*, 2*b*, and 2*c* schematically show respectively a focused light spot and the effect of moving the beam waist either closer to or further from the focusing means.
Figure 2B:
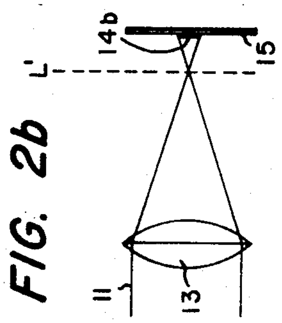
Figure 2C:
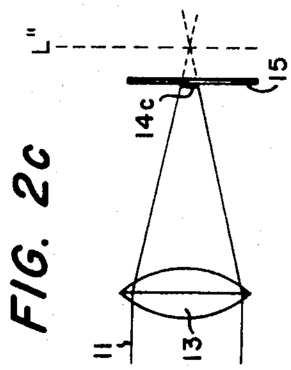

It can be seen that the first and second paths can represent different optical distances from beam waist 12 to focusing means 13. FIG. 2 represents the effect of change in the optical distance from beam waist 12 to focusing means 13 on the size of focused light spot 14. FIG. 2*a* shows the focused light spot **14*a* when the optical distance from beam waist 12 to focusing means 13 is such that the focal plane L coincides with the plane of memory medium 15**. In FIG. 2*b*, focusing means 13 and memory medium 15 have remained fixed while the optical distance from beam waist 12 to focusing means 13 has been increased. It can be seen that the focal plane L′ is located between focusing means 13 and memory medium 15. Focused light spot **14*b* is slightly out of focus and larger than focused light spot 14*a***. In FIG. 2*c* the optical distance from the beam waist 12 to focusing means 13 is less than that of FIG. 2*a*. As in FIG. 2*b*, the focal plane L″ does not coincide with the plane of memory medium 15. Focused light spot **14*c* is again slightly out of focus and larger than focused light spot 14*a***.

In one embodiment of the present invention, focusing means 13 and memory medium 15 are so arranged that the optical distance from beam waist 12 to focusing means 13 over the first path causes the focal plane L to coincide with the plane of memory medium 15, as illustrated in FIG. 2*a*. The optical distance from beam waist 12 to focusing means 13 is greater when light beam 11 traverses the second path. Therefore, the size of focused light spot 14 is increased when light beam 11 traverses the second path as illustrated by FIG. 2*b*. In an alternative embodiment, focusing means 13 and memory medium 15 are arranged such that the optical distance from beam waist 12 to focusing means 13 over the second path causes focal plane L to coincide with the plane of memory medium 15. In that case, directing light beam 11 to traverse the first path causes an increase in the size of the focused light spot 14 as shown in FIG. 2*c*.

Figures 3, 4:
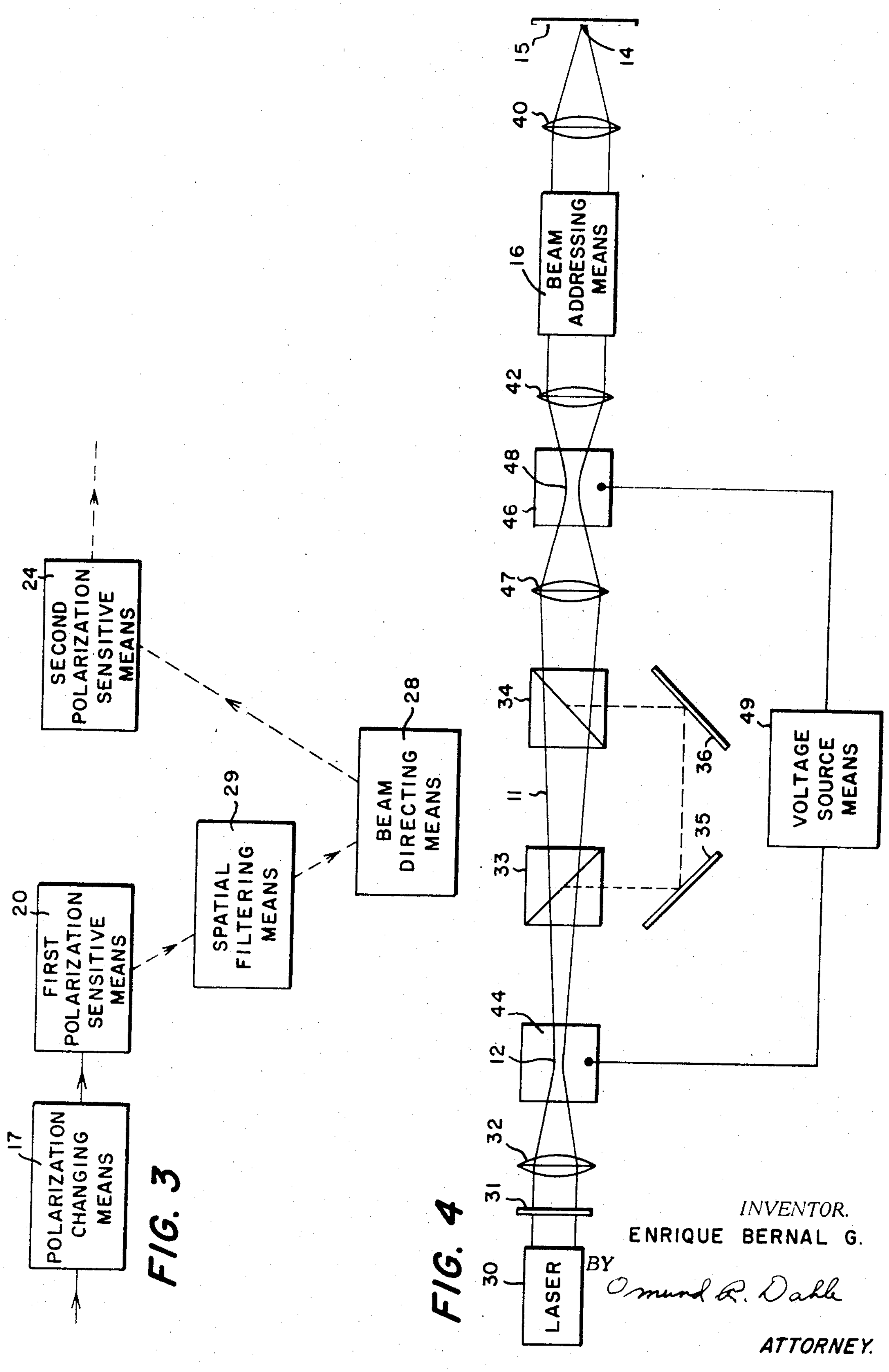
FIG. 3 shows an embodiment of the present invention including filtering means positioned in the second path of the light beam.
FIG. 4 shows an optical system including another embodiment of the present invention.

FIG. 3 shows another embodiment of the present invention which is similar to that shown in FIG. 1 but further includes spatial filtering means 29 which is located in the second path. Spatial filtering means 29 introduces a complex phase shift which is dependent on coordinates of the plane perpendicular to the direction of propagation of light beam 11. Examples of such spatial filtering means include phase plates, attenuators, apertures and lenses (which introduce real quadratic phase shifts). In this manner, spatial filtering means 29 alters the spatial pattern of light beam 11 as it traverses the second path. Therefore, the focused light spot formed by light beam 11 when it traverses a second path has a spatial pattern which is different from that of a focused light spot formed when light beam 11 traverses the first path.

The addition of spatial filtering means 29 greatly enhances the number applications of the present invention since many optical systems require the selective change of the spatial pattern of the focused light spot 14 rather than, or in addition to, changing the size of focused light spot 14. For instance, spatial filtering means 29 may change the intensity distribution of focused light spot 14 from the Gaussian distribution to a nearly uniform distribution over the entire area of the spot. It should be noted that while spatial filtering means 29 is shown in FIG. 3 between first polarization sensitive means 20 and beam directing means 28, it is obvious that it could be located anywhere in the second path. Furthermore, it is obvious that when spatial filtering means 29 is located in the second path, the first and second paths can represent either different or identical optical distances from beam waist 12 to focusing means 13.

In one particularly useful embodiment of the present invention, spatial filtering means 29 alters the spatial pattern of light beam 11 as it traverses the second path so as to create a second beam waist in the second path at an optical distance from focusing means 13 which is essentially equal to the optical distance from first beam waist 12 to focusing means 13 over the first path. The second beam waist has a spatial pattern which is different from that of first beam waist 12.

Referring to FIG. 4, an optical system similar to that illustrated in FIG. 1 is shown. Numerals similar to those of FIG. 1 are used to designate similar elements. Light source 10 of FIG. 1 is replaced by laser 30 which produces light beam 11, polarizer 31 which causes light beam 11 to have a first polarization direction, and converging lens 32 which causes light beam 11 to have a beam waist 12. First and second polarizing beam splitters 33 and 34 represent first and second polarization sensitive means 20 and 24 of FIG. 1. The function of beam directing means 28 of FIG. 1 is performed by first and second mirrors 35 and 36, respectively. As in FIG. 1, the second path of light beam 11 is shown by a dashed line. Lens 40 replaces focusing means 13 of FIG. 1. In addition, lens 42 is provided to cause the rays of light beam 11 to be parallel as light beam 11 passes through the beam-addressing means 16.

Polarization changing means 17 of FIG. 1 is replaced by electro-optic crystal 44 which has electric field controllable indices of refraction. When the appropriate electric field is applied to electro-optic crystal 44, the polarization direction of light beam 11 is changed from the first polarization direction to the second polarization direction. As shown in FIG. 4, electro-optic crystal 44 is located essentially at beam waist 12. This preferred arrangement allows the use of a minimum amount of electro-optic material, thus allowing a substantial reduction in cost. In addition, the operation of electro-optic crystal 44 is enhanced because the rays of light beam 11 are essentially parallel at beam waist 12.

In many optical systems, the polarization direction of light beam 11 must not vary. It can be seen that light beam 11 emerging from second polarizing beam splitter 34 has a first polarization direction after traversing the first path and a second polarization direction after traversing the second path. For this reason the optical system shown in FIG. 4 further includes a second electro-optic crystal 46 capable of controllably changing the polarization direction of light beam 11 from the second polarization direction to the first polarization direction in response to an applied electric field. Second electro-optic crystal 46 is positioned between second polarizing beam splitter 34 and lens 40. Voltage source means 49 simultaneously operates electro-optic crystals 44 and 46 such that light beam 11 will have a first polarization direction after passing through electro-optic crystal 46 regardless of which path was traversed. Converging lens 47 creates a beam waist 48 at which second electro-optic crystal 46 is located in order to conserve the amount of electro-optic material utilized.

Despite the distinct advantages of the system shown in FIG. 4, there are two serious drawbacks to the system. First, the use of two polarization sensitive means such as first and second polarizing beam splitters 33 and 34 greatly increase the cost of the system. Second, the precise alignment of first and second polarizing beam splitters 33 and 34 and mirrors 35 and 36 which is required for the first and second paths to be co-linear after emerging from second polarizing beam splitter 34 is quite difficult.

Figure 5:
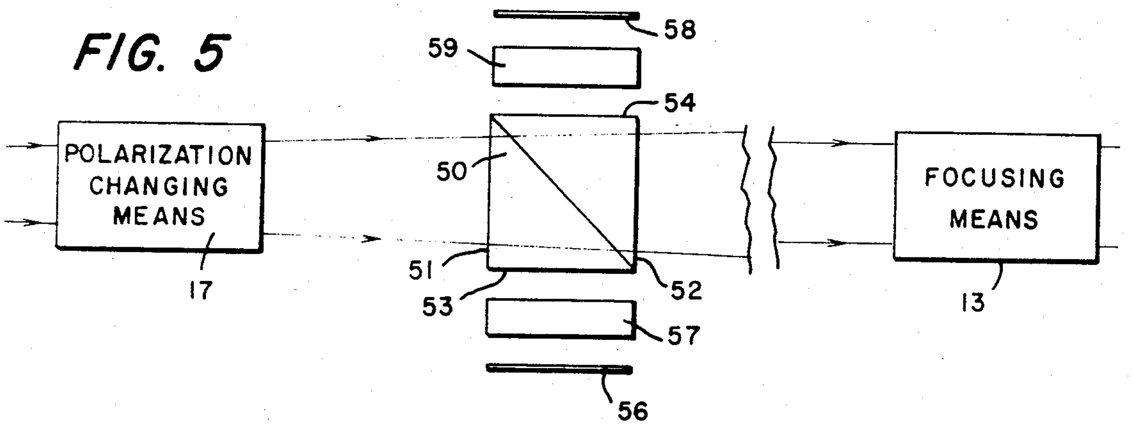
FIG. 5 shows an embodiment of the present invention utilizing a single polarization sensitive means.

FIG. 5 shows a preferred embodiment of the present invention which utilizes a single polarization sensitive means and which more readily lends itself to the precise optical alignment necessary in the present invention. Polarization sensitive means 50 has an entrance window 51 through which light beam 11 enters from polarization changing means 17 and an exit window 52 from which light beam 11 emerges toward focusing means 13. In addition, polarization sensitive means 50 has first and second auxiliary windows 53 and 54 respectively. First reflective means 56 is positioned to receive a light beam emerging from first auxiliary window 53 and to reflect the light beam back toward polarization sensitive means 50 such that the light beam reenters the first auxiliary window 53. First polarization shifting means 57 is positioned between first auxiliary window 53 and first reflective means 56. Second reflective means 58 and second polarization shifting means 59 are similarly positioned adjacent second auxiliary window 54.

Polarization sensitive means 50 is so constructed and arranged that if light beam 11 had a first polarization direction when it enters entrance window 51, polarization sensitive means 50 directs light beam 11 to emerge from exit window 52. If on the other hand, light beam 11 has the second polarization direction upon entering entrance window 51, light beam 11 is directed to emerge from first auxiliary window 53. In addition, a light beam entering the first auxiliary window 53 emerges from the second auxiliary window 54 if the light beam has a first polarization direction, and a light beam entering the second auxiliary window 54 emerges from exit window 52 if the light beam has a second polarization direction. Therefore, when light beam 11 enters polarization sensitive means 50 through entrance window 21, it traverses a first path if it has a first polarization direction and a second path if it has a second polarization direction.

Figures 6A, 6B:
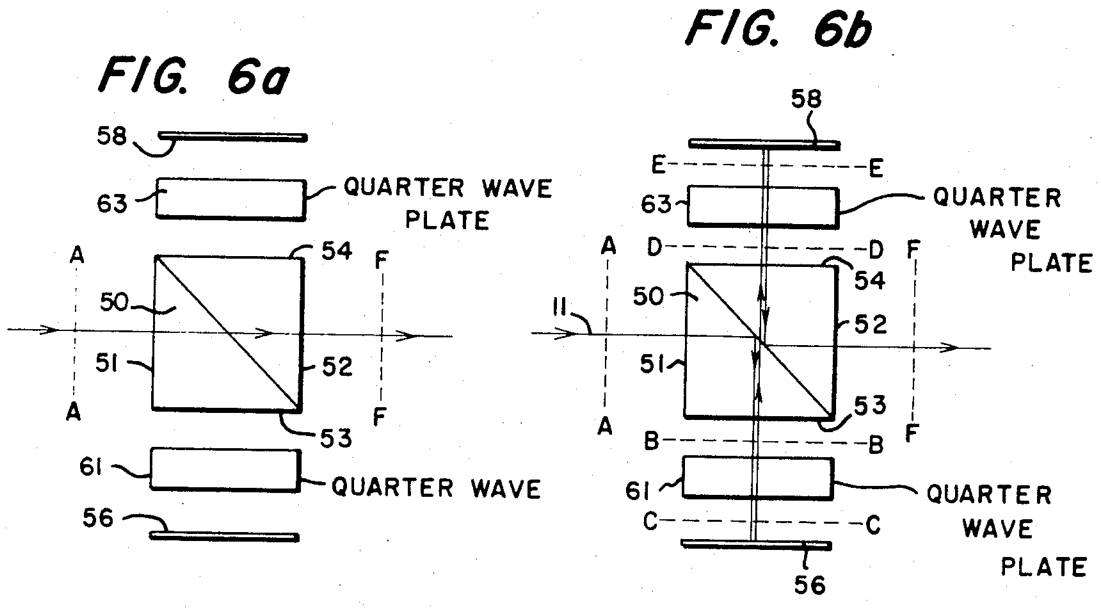
FIGS. 6*a* and 6*b* schematically show respectively the first and second paths which can be traversed by a light beam in an embodiment similar to that of FIG. 5.

FIG. 6 schematically shows the two paths traversed by light beam 11 for an embodiment of the present invention in which the first and second polarization directions are orthogonal and first and second polarization shifting means 57 and 59 of FIG. 5 comprise first and second quarter-wave plates 61 and 63 respectively. In FIG. 6*a*, light beam 11 enters entrance window 51 having a first polarization direction and is directed to emerge from exit window 52. The first path thereby comprises entering the entrance window 51 and emerging from exit window 52 toward focusing means 13. FIG. 6*b* shows the second path traversed when light beam 11 enters polarization sensitive means 50 through entrance window 51 with a second polarization direction. Light beam 11 is directed to emerge from first auxiliary window 53 and passes through first quarter-wave plate 61. Light beam 11 is then reflected by first reflective means 56 back toward polarization sensitive means 50 such that the light beam 11 passes again through first quarter-wave plate 61 and re-enters first auxiliary window 53. First quarter-wave plate 61 changes the polarization direction of light beam 11 each time light beam 11 passes through such such that while light beam 11 had a second polarization direction when it emerged from first auxiliary window 53, light beam 11 has a first polarization direction when it re-enters first auxiliary window 53. Because it has the first polarization direction, light beam 11 re-entering first auxiliary window 53 is directed to emerge from the second auxiliary window 54. Light beam 11 passes through second quarter-wave plate 63, is reflected back toward polarization sensitive means 50 by second reflective means 58, again passes through second quarter-wave plate 63 and re-enters second auxiliary window 54. The polarization direction of light beam 11 is changed with each passage through second quarter-wave plate 63 such that light beam 11 has the second polarization direction as it re-enters second auxiliary window 54. Therefore light beam 11 is directed from second auxiliary window 54 to emerge from exit window 52 co-linear with the first path.

Referring to FIG. 7, the polarization direction of light beam 11 is schematically shown for various points in the first and second paths as indicated in FIG. 6. For the first path, light beam 11 has a first polarization direction at point A, FIG. 7*a*. Light beam 11 enters polarization sensitive means 50 through entrance window 51 and emerges from exit window 52 with no change in polarization direction such that at point F light beam 11 still has a first polarization direction. To traverse the second path, light beam 11 has a second polarization direction at point A, FIG. 7*b*. As light beam 11 emerges from first auxiliary window 53, it retains the second polarization direction at point B. The polarization of light beam 11 at point B is designated as $B_E$ when light beam 11 is emerging from the polarization sensitive element 11 and $B_R$ when light beam 11 is re-entering the polarization sensitive element 50. As light beam 11 passes through first quarter-wave plate 61, the phase relationship between window ordinary and extraordinary rays of light beam 11 is altered such that the polarization at $C_E$ is left circularly polarized. When light beam 11 is reflected by first reflective means 56, the phase relationship of the ordinary and extraordinary rays is unchanged, but the direction of propagation of the beam is reversed, and therefore light beam 11 is right circularly polarized at $C_R$. Passage through first quarter-wave plate 16 again causes a change in the phase relationship between the ordinary and extraordinary rays such that light beam 11 has the first polarization direction $B_R$. Light beam 11 passes through polarization sensitive element 50 and emerges from second auxiliary window 54 with no change in the polarization direction such that at $B_E$ light beam 11 has first polarization direction. After passing through second quarter-wave plate 63, light beam 11 is right circularly polarized at $E_E$. Reflection by second reflective means 58 reverses the direction of propagation such that at $E_R$ light beam 11 is left circularly polarized. After passing again through second quarter-wave plate 63 light beam 11 is again linearly polarized in the second polarization direction. Light beam 11 re-enters second auxiliary window 54 and emerges from exit window 52 with the second polarization direction.

From the foregoing discussion it can be seen that polarization sensitive means 50 is a composite of first and second polarization sensitive means 20 and 24 of FIG. 1. Entrance window 51, for example, corresponds to entrance window 21 of first polarization sensitive means 20 and first entrance window 25*a* of second polarization sensitive means 24. Similarly, exit window 52 corresponds to first exit window 22*a* and exit window 26. First auxiliary window 51 is the counterpart of second exit window 22*b*. Second auxiliary window 54 is the counterpart of second entrance window 25*b*. In addition, first and second reflective means 56 and 58 and first and second polarization shifting means 57 and 59 direct light beam 11 emerging from first auxiliary window 53 to enter second auxiliary window 54 with a second polarization direction such that light beam 11 emerges from exit window 52 co-linear with the first path. In this manner first and second reflective means 56 and 58 and first and second polarization shifting means 57 and 59 comprise beam directing means identical in function to that of beam directing means 28 of FIG. 1.

FIG. 8 shows another embodiment of the present invention in which polarization sensitive means 50, first and second reflective means 56 and 58, and first and second polarization shifting means 57 and 59 comprise a unitary body. The surfaces of first and second auxiliary windows 23 and 24 and surfaces 57*a* and 59*a* of first and second polarization shifting means 57 and 59, respectively, are polished to provide precise alignment.

First and second polarization shifting means 57 and 59 are attached to polarization sensitive means 50 by an optical contact cement. First and second reflective means 56 and 58 comprise reflective coatings attached to polished surfaces 57*b* and 59*b* respectively.

One significant advantage of the device of FIG. 8 is that the precise optical alignment necessary in the present invention is accomplished during fabrication of the device, when the close tolerances can more easily be achieved, rather than during installation of the device in the optical system. Furthermore, because the device is a unitary body, there is no possibility of misalignment of first and second reflective means 56 and 58 during operation of the system.

FIG. 9 shows another embodiment of the present invention. First and second polarization shifting means 57 and 59 of FIG. 5 comprise first and second 45° Faraday rotators 66 and 68 respectively. In addition, spatial filtering means 70 is located between first auxiliary window 53 and first reflective means 56. Spatial filtering means 70 is similar in operation to spatial filtering means 29 of FIG. 3. The spatial pattern of light beam 11 as it traverses the second path is altered by spatial filtering means 70 such that the focused light spot 14 formed by light beam 11 traversing the second path has a spatial pattern which is different from a light spot formed by light beam 11 when traversing the first path. In one preferred embodiment of the present invention, spatial filtering means 70 alters the spatial pattern of light beam 11 as it traverses the second path so as to create a second beam waist in the second path at an optical distance from focusing means 13 which is essentially equal to the optical distance from first beam waist 12 to focusing means 13 over the first path.

Figures 10, 11, 12B:
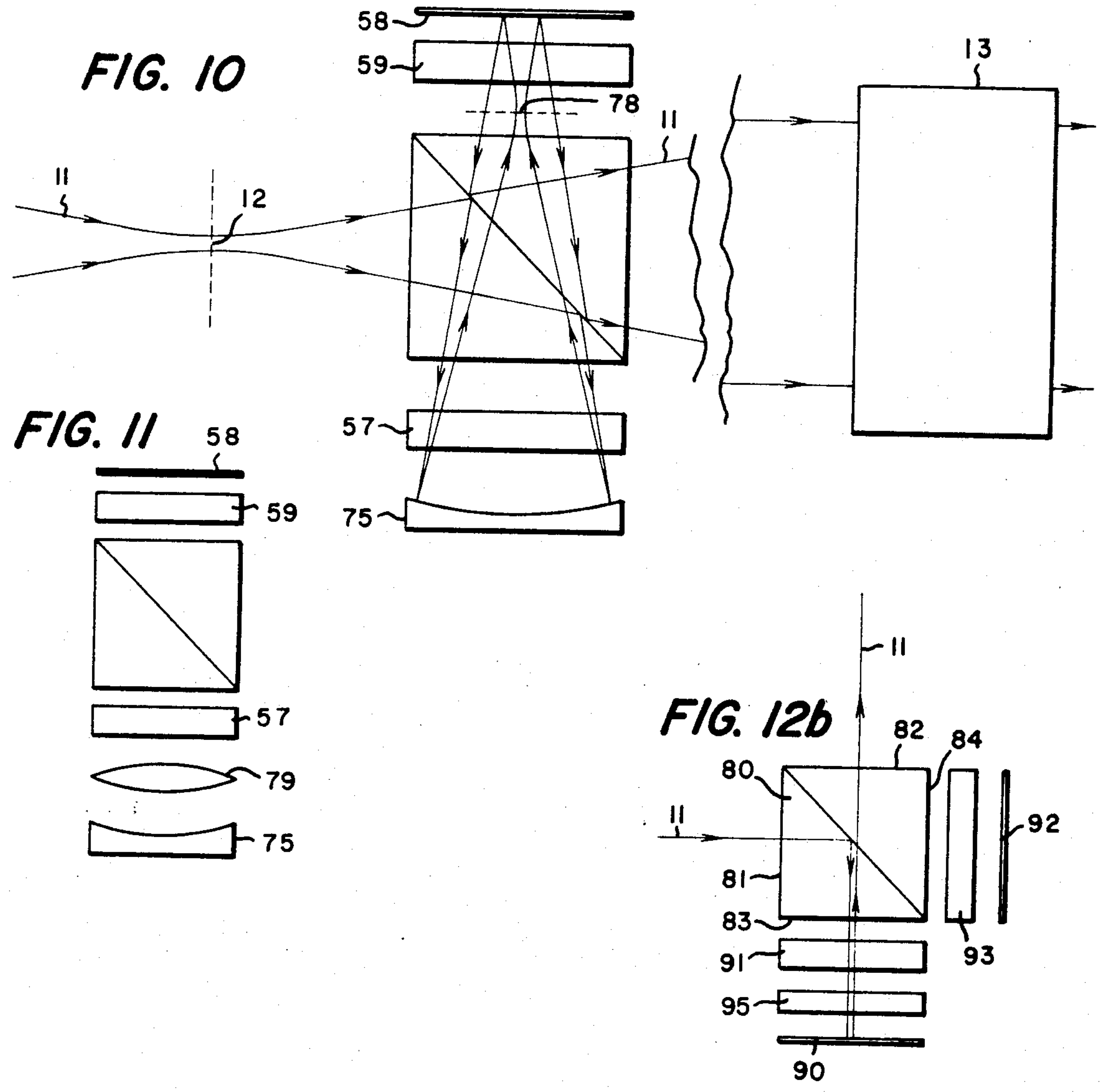
FIG. 10 shows an embodiment of the present invention in which the spatial filtering means and the first reflective means comprise a concave mirror.
FIG. 11 shows an embodiment of the present invention including a concave mirror and lens means positioned in the second path of the light beam.
FIGS. 12*a* and 12*b* show respectively the first and second paths traversed by a light beam in another embodiment of the present invention.

FIG. 10 shows an embodiment of the present invention similar to that of FIG. 9 in which first reflective means 56 and spatial filtering means 75 comprise a concave mirror 75. Concave mirror 75 is positioned at an optical distance from first beam waist 12 which is greater than the focal length of concave mirror 75 such that a second beam waist 78 is created at an optical distance from focusing means 13 which is equal to the distance from first beam waist 12 to focusing means 13 over the first path. The spatial pattern of second beam waist 78 is different from that of first beam waist 12. For instance, with the proper selection of concave mirror 75, the diameter of light beam 11 at second beam waist 78 may be either larger or smaller than the beam diameter at beam waist 12. In addition, it is obvious to those skilled in the art that the position of concave mirror 75 can be varied, thereby changing the position of beam waist 78.

FIG. 11 shows another embodiment of the present invention similar to that shown in FIG. 10. Lens means 79 is positioned between first polarization shifting means 57 and concave mirror 75. Although lens means 79 is a reciprocal optical element, concave mirror 75 is a non-reciprocal element and therefore the combination concave mirror 75 and lens means 79 acts as a telescope, thereby changing the spatial pattern of light beam 11.

FIG. 12 shows the first and second alternative paths of light beam 11 for another embodiment of the present invention. Polarization sensitive element 80 has an entrance window 81, an exit window 82, and first and second auxiliary windows 83 and 84 respectively. Polarization sensitive means 80 is so constructed and arranged that light beam 11 enters entrance window 81 and emerges from second auxiliary window 84 if light beam 11 has a first polarization direction and emerges from first auxiliary window 83 if light beam 11 has a second polarization direction. In addition, a light beam entering first auxiliary window 83 emerges from exit window 82 if the light beam has first polarization direction and a light beam entering second auxiliary window 84 emerges from exit window 82 if the light beam has a second polarization direction. As in the embodiments previously discussed, the first reflecting means 90 and first polarization shifting means 91 are positioned adjacent first auxiliary window 83 and second relfective means 92 and second polarization shifting means 93 are positioned adjacent second auxiliary window 84. In addition, spatial filtering means 95 is positioned between first reflective means 90 and first polarization shifting means 91.

Figure 12A:
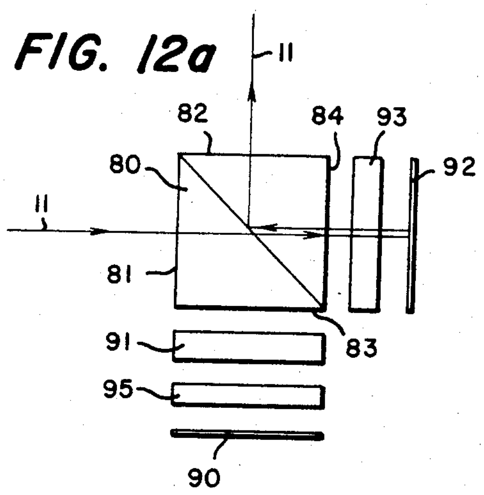

In operation, if light beam 11 has a first polarization direction when it enters the polarization sensitive means 80, it traverses a first path shown in FIG. 12*a*. The first path comprises entering polarization sensitive means 80 through entrance window 81, emerging from second auxiliary window 84, passing through second polarization shifting means 93, being reflected by second reflective means 93 back toward the second auxiliary window over essentially the same path, passing again through second polarization shifting means 93, re-entering second auxiliary window 84 with a second polarization direction and emerging from exit window 82 toward focusing means 13.

As shown in FIG. 12*b*, if light beam 11 has a second polarization direction when it enters polarization sensitive means 80, it traverses a second path. The second path comprises entering polarization sensitive means 80 through entrance window 81, emerging from first auxiliary window 83, passing through first polarization shifting means 91 and spatial filtering means 95, being reflected by first reflective means 90 back toward first auxiliary window 83 over essentially the same path, passing again through spatial filtering means 95 and first polarization shifting means 91, re-entering polarization sensitive means 80 through first auxiliary window 83 with a first polarization direction, and emerging from exit window 82 co-linear with the first path. Passage of light beam 11 through spatial filtering means 95 causes the focused light spot produced when light beam 11 traverses the second path to be different from a focused light spot produced when light beam 11 traverses the first path.

While this invention has been disclosed with reference to a series of preferred embodiments, it should be understood by those skilled in the art that changes in form and detail may be made without departing from the spirit and scope of the invention. For example, although the embodiment shown in FIG. 12 includes spatial filtering means 95, it is obvious from the foregoing discussion that the spatial pattern of the focused light spot can be selectively changed without the use of spatial filtering means 95 if the first and second paths represent different optical distances.

The embodiments of the invention in which an exclusive property or right is claimed are defined as follows:

1. In an optical system having a light source for producing an essentially coherent polarized light beam with a first beam waist therein, and having focusing means for forming a focused light spot, apparatus for selectively changing the spatial pattern of the focused light spot by selectively directing the light beam to traverse either a first or a second path, the focused light spot having a first spatial pattern when the light beam traverses the first path and a second spatial pattern different from the first spatial pattern when the light beam traverses the second path, the apparatus comprising:

first polarization changing means for controllably changing the polarization direction of the polarized light beam from a first polarization direction to a second polarization direction, first polarization sensitive means having an entrance window, and first and second exit windows, the first polarization sensitive means constructed and arranged to direct a light beam entering the entrance window to emerge from the first exit wondow if the light beam has a first polarization direction and to emerge from the second exit window if the light beam has a second polarization direction, second polarization sensitive means having first and second entrance windows and an exit window, the second polarization sensitive means constructed and arranged to direct a light beam entering the first entrance window to emerge from the exit window if the light beam has a first polarization direction, and to direct a light beam entering the second entrance window to emerge from the exit window if the light beam has a second polarization direction, beam directing means positioned to receive a light beam emerging from the second exit window of the first polarization sensitive means and to direct the light beam toward the second polarization sensitive means such that the light beam enters the second polarization sensitive means through the second entrance window, whereby a light beam having a first polarization direction which enters the first polarization sensitive means through the entrance window traverses the first path, which comprises entering the entrance window, emerging from the first exit window of the first polarization sensitive means, entering the second polarization sensitive means through the first entrance window, and emerging from the exit window of the second polarization sensitive means toward the focusing means, and a light beam having a second polarization direction which enters the first polarization sensitive means through the entrance window traverses the second path, which comprises entering the entrance window of the first polarization sensitive means, emerging from the second exit window, entering the second polarization sensitive means through the second entrance window, and emerging from the exit window of the second polarization sensitive means co-linear with the first path.

2. The invention as described in claim 1 and further comprising spatial filtering means positioned in the second path for altering the spatial pattern of the light beam traversing the second path.

3. The invention as described in claim 1 wherein the first and second paths represent different optical distances from the first beam waist to the focusing means.

4. The invention as described in claim 3 and further comprising spatial filtering means positioned in the second path for altering the spatial pattern of light beam traversing the second path.

5. The invention as described in claim 4 wherein the spatial filtering means is constructed and arranged to create a second beam waist in the second path at an optical distance from the focusing means essentially equal to the optical distance from the first beam waist to the focusing means over the first path, the second beam waist having a spatial pattern which is different from that of the first beam waist.

6. The invention as described in claim 1 wherein the first polarization changing means comprise an electro-optic crystal for selectively changing the polarization direction of the polarized light beam from the first polarization direction to the second polarization direction in response to an applied electric field.

7. The invention as described in claim 6 wherein the electro-optic crystal is positioned essentially at the first beam waist.

8. The invention as described in claim 1 and further comprising:

second polarization changing means positioned between the second polarization sensitive means and the focusing means for controllably changing the polarization direction of the light beam from the second polarization direction to the first polarization direction when the first polarization selecting means changes the polarization direction of the light beam from the first polarization direction to the second polarization direction.

9. The invention as described in claim 8 wherein the first and second polarization changing means comprise electo-optic crystals.

10. In an optical system having a light source for producing an essentially coherent polarized light beam with a first beam waist therein, and having focusing means for forming a focused light spot, apparatus for selectively changing the spatial pattern of the focused light spot by selectively directing the light beam to traverse either a first or a second path, the focused light spot having a first spatial pattern when the light beam traverses the first path and a second spatial pattern different from the first spatial pattern when the light beam traverses the second path, the apparatus comprising:

first polarization changing means for controllably changing the polarization direction of the polarized light beam from a first polarization direction to a second polarization direction, polarization sensitive means having an entrance window, an exit window, and first and second auxiliary windows, the polarization sensitive means constructed and arranged to direct a light beam entering the entrance window to emerge from the exit window if the light beam has a first polarization direction and to emerge from the first auxiliary window if the light beam has a second polarization direction, to direct the light beam entering the first auxiliary window to emerge from the second auxiliary window if the light beam has a first polarization direction, and to direct the light beam entering the second auxiliary window to emerge from the exit window if the light beam has a second polarization direction, beam directing means positioned to receive a light beam emerging from the first auxiliary window and to direct the light beam to enter the second auxiliary window with a second polarization direction, whereby a light beam having a first polarization direction which enters the polarization sensitive means through the entrance window traverses the first path, which comprises entering the entrance window, and emerging from the exit window toward the focusing means, and a light beam having a second polarization direction which enters the polarization sensitive means through the entrance window traverses the second path, which comprises entering the exit window, emerging from the first auxiliary window, entering the second auxiliary window, and emerging from the exit window co-linear with the first path.

11. The invention as described in claim 10 wherein the first polarization changing means comprise an electro-optic crystal for selectively changing the polarization direction of the polarized light beam from the first polarization direction to the second polarization direction in response to an applied electric field.

12. The invention as described in claim 11 wherein the electro-optic crystal is positioned essentially at the first beam waist.

13. The invention as described in claim 10 and further comprising:

second polarization changing means positioned between the polarization sensitive means and the focusing means for controllably changing the polarization direction of the light beam from the second polarization direction to the first polarization direction when the first polarization changing means changes the polarization direction of the light beam from the first polarization direction to the second polarization direction.

14. The invention as described in claim 13 wherein the first and second polarization changing means comprise electro-optic crystals.

15. The invention as described in claim 10 wherein the beam directing means comprise:

first reflective means positioned to receive a light beam emerging from the first auxiliary window and to reflect the light beam back toward the polarization sensitive means such that the light beam re-enters the first auxiliary window, first polarization shifting means positioned between the first auxiliary window and the first reflective means for changing the polarization direction of the light beam such that the light beam re-entering the first auxiliary window has the first polarization direction, second reflective means positioned to receive a light beam emerging from the second auxiliary window and to reflect the light beam back toward the polarization sensitive means such that the light beam re-enters the second auxiliary window, and second polarization shifting means positioned between the second auxiliary window and the second reflective means for changing the polarization direction of the light beam such that the light beam re-entering the second auxiliary window has the second polarization direction, and whereby the second path comprises entering the entrance window, emerging from the first auxiliary window, re-entering the first auxiliary window, emerging from the second auxiliary window, reentering the second auxiliary window, and emerging from the exit window co-linear with the first path.

16. The invention as described in claim 15 and further comprising spatial filtering means positioned in the second path for altering the spatial pattern of the light beam traversing the second path.

17. The invention as described in claim 16 wherein the spatial filtering means is constructed and arranged to create a second beam waist in the second path at an optical distance from the focusing means essentially equal to the optical distance from the first beam waist to the focusing means over the first path, the second beam waist having a spatial pattern which is different from that of the first beam waist.

18. The invention as described in claim 16 wherein the first reflective means and the spatial filtering means comprise a concave mirror.

19. The invention as described in claim 18 wherein the concave mirror is positioned at an optical distance from the first beam waist which is at least as great as the focal length of the concave mirror.

20. The invention as described in claim 18 and further comprising lens means positioned between the concave mirror and the polarization sensitive means.

21. The invention as described in claim 15 wherein the first and second polarization shifting means are quarter-wave plates.

22. The invention as described in claim 15 wherein the first and second polarization shifting means are 45° Faraday rotators.

23. The invention as described in claim 15 wherein the polarization sensitive means, the first and second reflective means, and the first and second polarization shifting means comprise a unitary body.

24. The invention as described in claim 23 wherein the unitary body further includes spatial filtering means positioned in the second path for altering the spatial pattern of the light beam traversing the second path.

25. In an optical system having a light source for producing an essentially coherent polarized light beam with a first beam waist therein, and having focusing means for forming a focused light spot, apparatus for selectively changing the spatial pattern of the focused light spot by selectively directing the light beam to traverse either a first or a second path, the focused light spot having a first spatial pattern when the light beam traverses the first path and a second spatial pattern different from the first spatial pattern when the light beam traverses the second path, the apparatus comprising:

first polarization changing means for controllably changing the polarization direction of the polarized light beam from a first polarization direction to a second polarization direction, polarization sensitive means having an entrance window, an exit window, and first and second auxiliary windows, the polarization sensitive means constructed and arranged to direct a light beam entering the entrance window to emerge from the second auxiliary window if the light beam has a first polarization direction and to emerge from the first auxiliary window if the light beam has a second polarization direction, to direct a light beam entering the first auxiliary window to emerge from the exit window if the light beam has a first polarization direction, and to direct a light beam entering the second auxiliary window to emerge from the exit window, if the light beam has a second polarization direction, first reflective means positioned to receive a light beam emerging from the first auxiliary window and to reflect the light beam back toward the polarization sensitive means such that the light beam re-enters the first auxiliary window, first polarization shifting means positioned between the first auxiliary window and the first reflective means for changing the polarization direction of the light beam such that the light beam re-entering the auxiliary window has a first polarization direction, second reflective means positioned to receive a light beam emerging from the second auxiliary window and to reflect the light beam back toward the polarization sensitive means such that the light beam re-enters the second auxiliary window, second polarization shifting means positioned between the second auxiliary window and the second reflective means for changing the polarization direction of the light beam re-entering the second auxiliary window to the second polarization direction, whereby a light beam having a first polarization direction which enters the polarization sensitive means through the entrance window traverses the first path, which comprises entering the entrance window, emerging from the second auxiliary window, re-entering the second auxiliary window, and emerging from the exit window toward the focusing means, and a light beam having a second polarization direction which enters the polarization sensitive means through the entrance window traverses the second path, which comprises entering the entrance window, emerging from the first auxiliary window, re-entering the first auxiliary window, and emerging from the exit window co-linear with the first path.

26. The invention as described in claim 25 wherein the first and second paths represent different optical distances from the first beam waist to the focusing means.

27. The invention as described in claim 25 and further comprising spatial filtering means positioned in the second path for altering the spatial pattern of the light beam traversing the second path.

* * * * *